R. R. BROWN.
TIRE.
APPLICATION FILED JULY 13, 1907.
916,264. Patented Mar. 23, 1909.
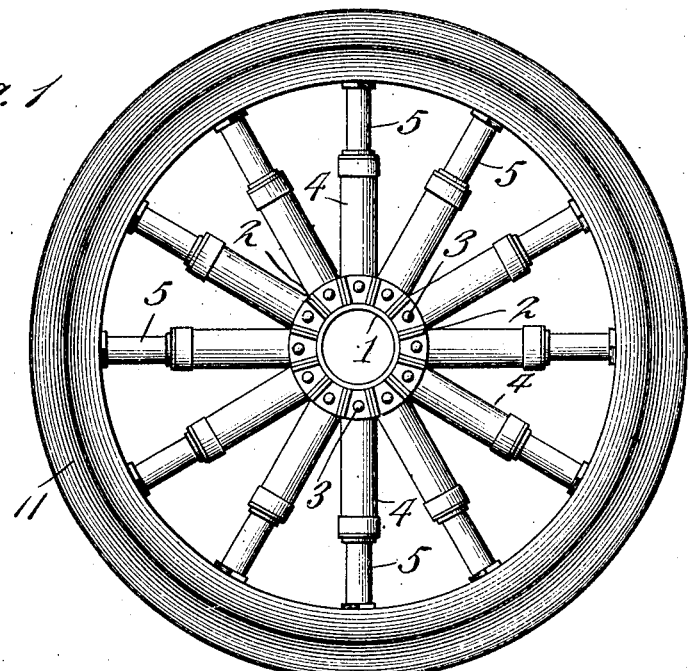
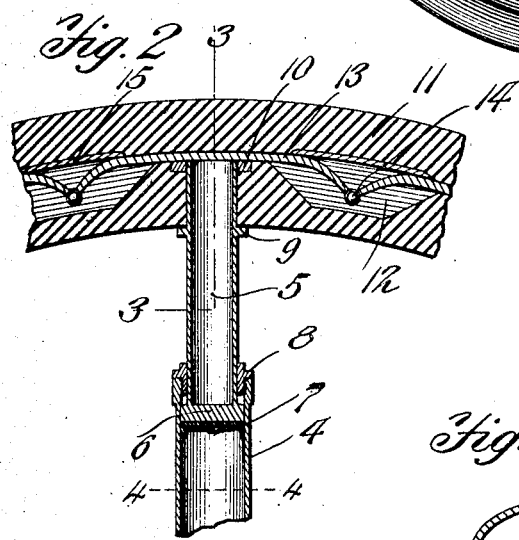
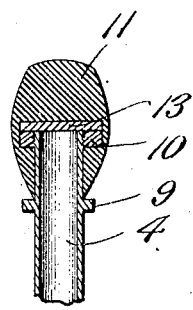
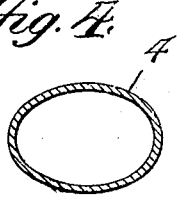
Witnesses
Inventor
Ralph R. Brown
By Victor J. Evans
Attorney

UNITED STATES PATENT OFFICE.

RALPH R. BROWN, OF LIVERMORE, CALIFORNIA.

TIRE.

No. 916,264.  Specification of Letters Patent.  Patented March 23, 1909.

Application filed July 13, 1907. Serial No. 383,588.

*To all whom it may concern:*

Be it known that I, RALPH R. BROWN, a citizen of the United States, residing at Livermore, in the county of Alameda and State of California, have invented new and useful Improvements in Tires, of which the following is a specification.

This invention relates to cushion tired wheels, and one of the principal objects of the same is to provide a wheel which will pass over obstructions without jarring. This and other objects may be attained by means of the construction illustrated in the accompanying drawing, in which:

Figure 1 is a side elevation of a wheel made in accordance with my invention. Fig. 2 is a detail sectional view taken through the tire and through a portion of one of the sectional spokes. Fig. 3 is a vertical section on the line 3—3 of Fig. 2. Fig. 4 is a transverse section on the line 4—4, of Fig. 2.

Referring to the drawing for a more particular description of my invention, the numeral 1 designates the hub of the wheel having a series of flanges 2 provided with seats for the inner ends of the spokes, said spokes being held in place by means of bolts 3 which extend through the inner hollow sections of the spokes and through the flange portions of the hub. The inner sections 4 of the spokes are hollow and are of elliptical shape as shown in Fig. 4, in cross section. The outer sections 5 of the spokes are also hollow and are provided with a piston head 6 having a suitable packing 7 secured thereto, said piston head being disposed within the hollow section 4, and the latter being filled with air to form a cushion against said piston head. A suitable stuffing box 8 provided with exterior screw threads is fitted into the outer ends of the rounded portions of the sections 4. The sections 5 of the spokes are provided with stop flanges 9 and at their outer ends the sections 5 are provided with threaded nuts 10 secured to the sections 5 and embedded in the rubber tire. The rubber tire 11 may be molded in sections, the inner section being provided with recesses 12, and a series of springs 13 which bear centrally upon the section 5 of the spokes, said springs being pivotally connected together at 14, the pivotal point being located in the recesses 12. Molded in the rubber tire are plates 15 which form abutments for the springs 13 and span the spaces between the downwardly curved portions thereof.

From the foregoing it will be obvious that a wheel made in accordance with my invention will absorb all shocks and jars of the vehicle in passing over obstacles; that the wheel may be made of any required size for automobiles or other wheeled vehicles, and that the wheel will operate efficiently for its purpose.

Having thus described the invention, what I claim is:

1. A vehicle wheel comprising a hub, yielding spokes, a resilient tire and springs located within the tire made in sections pivotally connected together and bearing on the outer ends of the spokes.

2. A vehicle wheel comprising a hub, telescopic spokes made in sections, one of said sections forming an air tube and the other section having a head fitted therein, rubber tires having bowed springs embedded therein, said springs being pivotally connected together and seated in recesses in said tire, and abutment plates spanning the pivotal points of said springs.

3. A vehicle wheel comprising a hub, yielding spokes, a tire in which the outer ends of the spokes are seated and bow springs located within the tire, said springs being made in sections pivotally connected together and bearing on the outer ends of the spokes.

In testimony whereof, I affix my signature in presence of two witnesses.

RALPH R. BROWN.

Witnesses:
D. McDONALD,
E. H. ACKER.